US005204692A

United States Patent [19]

Awai et al.

[11] Patent Number: 5,204,692

[45] Date of Patent: Apr. 20, 1993

[54] THERMAL TRANSFER RECORDING APPARATUS WITH THE INK SHEET CONVEYED, BEFORE RECORDING, IN A DIFFERENT DIRECTION AND BY A FRACTIONAL AMOUNT RELATIVE TO THAT BY WHICH THE RECORDING MEDIUM IS CONVEYED

[75] Inventors: Takashi Awai; Minoru Yokoyama, both of Yokohama; Yasushi Ishida, Tokyo; Akihiro Tomoda; Hisao Terajima, both of Yokohama; Takehiro Yoshida, Tokyo; Satoshi Wada, Kawasaki; Takeshi Ono, Yokohama; Makoto Kobayashi, Tama, all of Japan

[73] Assignee: Canon Kabushiki Kaisha, Tokyo, Japan

[21] Appl. No.: 409,790

[22] Filed: Sep. 20, 1989

[30] Foreign Application Priority Data

Sep. 22, 1988 [JP] Japan ................................ 63-236366

[51] Int. Cl.[5] ........................ B41J 2/325; B41J 33/36; B41J 15/00; H04N 1/23

[52] U.S. Cl. ................................ 346/76 PH; 400/120; 400/232; 400/583.4; 358/296

[58] Field of Search ................... 358/296; 346/76 PH; 400/120, 232, 583.4

[56] References Cited

U.S. PATENT DOCUMENTS

| | | | |
|---|---|---|---|
| 4,209,708 | 6/1980 | Sestini . | |
| 4,442,460 | 4/1984 | Kurata | 358/296 |
| 4,456,392 | 6/1984 | Nozaki | 400/120 |
| 4,456,392 | 6/1984 | Nozaki et al. | 400/120 |
| 4,531,135 | 7/1985 | Toshima . | |
| 4,577,199 | 3/1986 | Saiki et al. . | |
| 4,623,902 | 11/1986 | Yamanishi . | |
| 4,703,346 | 10/1987 | Bierhoff . | |
| 4,814,789 | 3/1989 | Ono | 346/76 PH |

FOREIGN PATENT DOCUMENTS

| | | |
|---|---|---|
| 0241304 | 10/1987 | European Pat. Off. . |
| 2388745 | 11/1978 | France . |
| 62-58917 | 1/1983 | Japan . |
| 58-201686 | 11/1983 | Japan . |
| 95177 | 6/1984 | Japan . |

*Primary Examiner*—Benjamin R. Fuller
*Assistant Examiner*—Scott A. Rogers
*Attorney, Agent, or Firm*—Fitzpatrick Cella, Harper & Scinto

[57] ABSTRACT

There is disclosed a thermal transfer recording apparatus for image recording by ink transfer from an ink sheet, in which the thermal head is energized in divided manner in plural blocks, and the recording sheet and the ink sheet are so transported as to generate a relative speed therebetween, thus facilitating the ink peeling from the ink sheet.

7 Claims, 16 Drawing Sheets

THERMAL TRANSFER RECORDING APPARATUS WITH THE INK SHEET CONVEYED, BEFORE RECORDING, IN A DIFFERENT DIRECTION AND BY A FRACTIONAL AMOUNT RELATIVE TO THAT BY WHICH THE RECORDING MEDIUM IS CONVEYED

BACKGROUND OF THE INVENTION

1. Field of the Invention

The present invention relates to a thermal transfer recording method for transferring the ink contained in an ink sheet onto a recording medium thereby recording an image thereon, and an apparatus adapted for effecting said method.

The above-mentioned thermal transfer recording apparatus includes a facsimile apparatus, an electronic typewriter, a copying machine, a printer or the like.

2. Related Background Art

In general, the image recording in a thermal transfer printer is achieved by utilizing an ink sheet formed by coating a base film with a heat-fusible (or heat-sublimable) ink, selectively heating said ink sheet corresponding to image signal with a thermal head and transferring thus fused (or sublimed) ink onto a recording sheet. Said ink sheet is usually a so-called one-time ink sheet which completely loses the ink after an image recording, so that it is necessary, after the recording of a character or a line, to advance the ink sheet by an amount corresponding to said recording, in order to insure that the unused portion of the ink sheet is brought to the next recording position. This fact increases the amount of use of the ink sheet, so that the running cost of a thermal transfer printer tends to be higher than that of the ordinary thermal printer in which the recording is made on thermal recording paper.

In order to solve this drawback, a thermal transfer printer in which the recording sheet and the ink sheet are advanced with different speeds is proposed for example in U.S. Pat. No. 4,456,392, the Japanese Laid-open Patent Sho 58-201686 and the Japanese Patent Publication Sho 62-58917. Also described in these patent references is the known so-called multi print sheet, which is an ink sheet capable of plural image recordings, and, in continuous recording of a length L, such multi print sheet allows the amount of advancement of the ink sheet, during or after the image recording to be less than said length L ($L/n{:}n>1$). Such method improves the efficiency of use of the ink sheet to n times, so that a reduction in the running cost of the thermal transfer printer can be expected. This method is hereinafter called the multi-printing method.

The present inventors have experimentally confirmed that the multi-printing with the thermal transfer method is preferably conducted with a larger relative speed between the recording sheet and the ink sheet, as will be explained in the following.

In the conventional heat transfer method, the ink of the ink sheet, fused by a heating, has to be completely peeled from the base film. However, in the multi-printing method in which the ink sheet is repeatedly used in n times, about 1/n of the ink layer has to be peeled and transferred by each heating. On the other hand, since the ink layer of the ink sheet is heat-fusible, there is required a larger shearing force for separating the ink layer, as the time from the heating with the thermal head to the peeling of the ink layer increases. It will therefore become difficult to properly peel the ink layer and to transfer the same onto the recording sheet (by 1/n) when said time becomes longer. Thus the separation of the ink layer by 1/n may not be properly conducted unless the relative speed between the recording sheet and the ink sheet is maintained at a certain level.

This drawback may particularly become a problem in a recording apparatus with intermittent advancement of the recording sheet, such as a facsimile apparatus. Let us consider a facsimile apparatus, as shown in FIG. 18, having a recording line length of 1/15.4 mm and having a thermal head which is divided into four blocks driven in succession with an interval of 2.5 ms. The shearing force for separating the ink of the ink layer heated by a block of the thermal head, from the other part of the ink layer, appears at the energization of the first of the blocks A-D ($T'_E$ represents the timing of energization), namely when the recording sheet is conveyed by a line in response to a command to start recording for the next line. However, at the energization of 2nd to 4th blocks, the recording sheet and the ink sheet are stopped together, so that the time until the generation of the necessary shearing force becomes longer. Since said time fluctuates in random manner for example in the facsimile apparatus, the shearing force for separating the ink layer also shows fluctuation.

In order to securely peel the ink layer of the ink sheet and transfer the same onto the recording sheet, copying with thus increased shearing force, there are required high-torque motors for conveying the recording sheet and the ink sheet. Because such motors are expensive, the cost of the entire apparatus is inevitably increased. Also since the recording sheet is generally conveyed by the friction with a platen roller, the shearing force exceeding a certain level may result in improper transportation of the recording sheet or the transporting speed of the recording sheet being affected by that of the ink sheet

SUMMARY OF THE INVENTION

An object of the present invention is to provide a thermal transfer recording method capable of improving the image quality, and a recording apparatus employing said method.

Another object of the present invention is to provide a thermal transfer recording method capable of reducing the consumption of the ink sheet and a recording apparatus employing said method.

Still another object of the present invention is to provide a thermal transfer recording method capable of reducing running costs and a recording apparatus employing said method.

Still another object of the present invention is to provide a thermal transfer recording method for generating a relative speed between the recording medium and the ink sheet at the recording, thereby decreasing the shearing force of the ink layer, thus realizing a substantially constant ink transfer at each recording and achieving multi-printing of high image quality, and a recording apparatus employing said method.

Still another object of the present invention is to provide a facsimile apparatus capable of improving image quality.

DETAILED DESCRIPTION OF THE PREFERRED EMBODIMENTS

Now the present invention will be clarified in detail by preferred embodiments thereof shown in the attached drawings.

Explanation of facsimile apparatus (FIGS. 1-4)

Figure 1A:
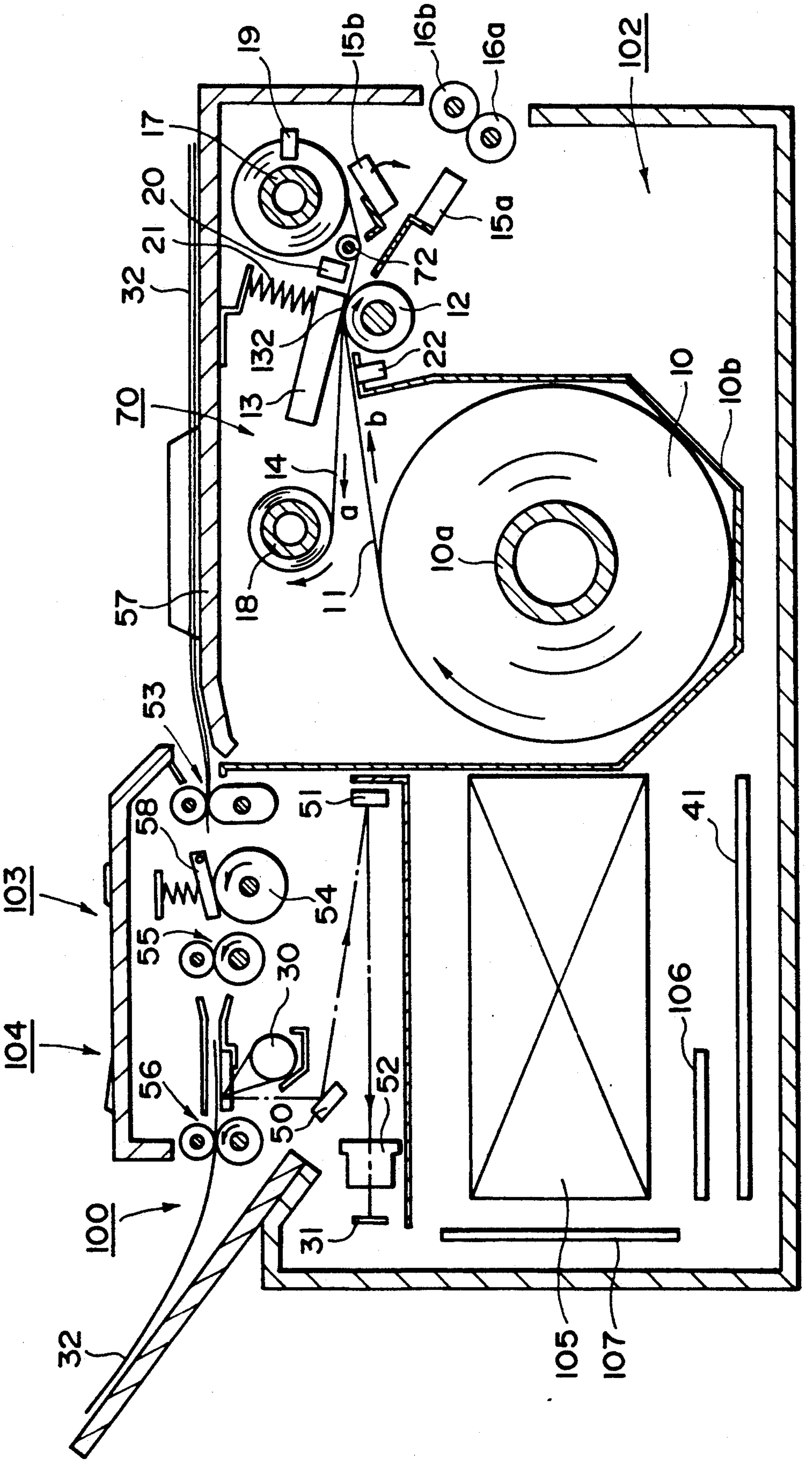
FIG. 1A is a lateral cross-sectional view of the mechanism of a facsimile apparatus embodying the present invention.
Figure 1B:
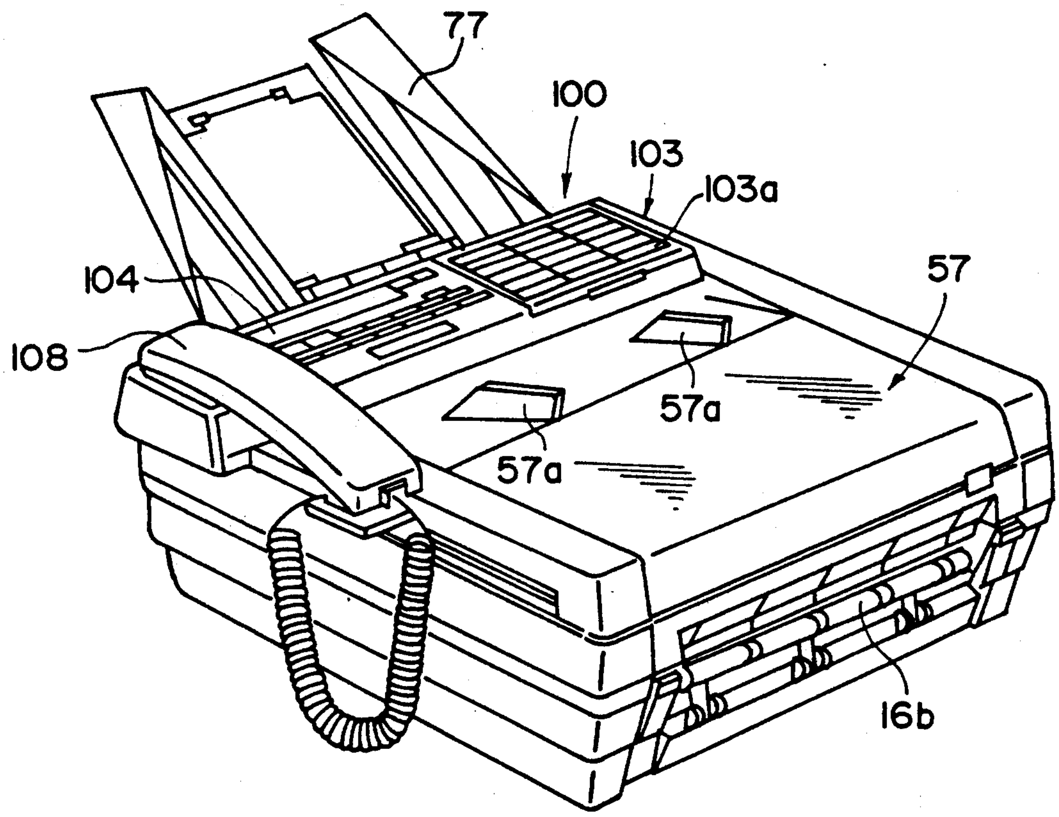
FIG. 1B is an external perspective view of said facsimile apparatus.
Figure 2:
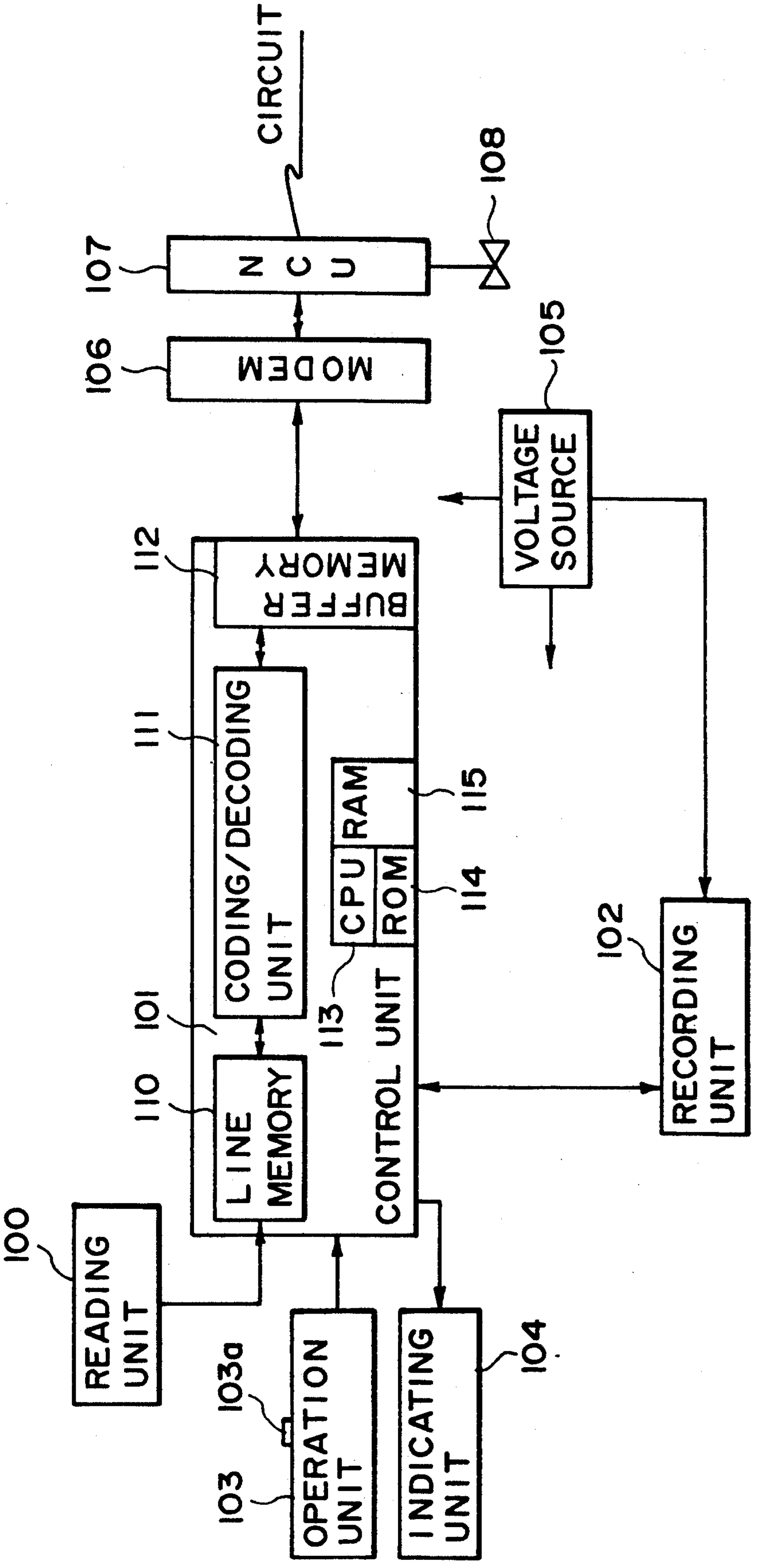
FIG. 2 is an electrical block diagram of said facsimile apparatus.

FIGS. 1 to 4 illustrate an embodiment of the thermal transfer printer of the present invention applied in a facsimile apparatus, wherein FIG. 1A is a lateral cross-sectional view of the facsimile apparatus, FIG. 1B is an external perspective view thereof, and FIG. 2 is a block diagram of said facsimile apparatus.

At first the structure will be briefly explained with reference to FIG. 2.

In FIG. 2, a reading unit 100 for photoelectrically reading an original image and supplying a control unit 101 with digital image signals, is provided with an original conveying motor and a CCD image sensor. A control unit 101 controls the entire apparatus and has the following structure. A line memory 110, for storing image data of each line stores the image data of a line from the reading unit 100 in case of the transmission or the copying, or the decoded image data of a line in case of the image data reception. Image formation is conducted supplying the stored data to a recording unit 102. An encoding/decoding unit 111 encodes the image information to be transmitted for example by MH encoding, and decodes the received encoded data into image data. A buffer memory 112 stores the encoded image data to be transmitted or the received encoded data. The various units of the control unit 101 and the entire apparatus are controlled by a CPU 113 such as a microprocessor. The control unit 101 is further provided, in addition to the CPU 113, with a ROM 114 storing the control program of the CPU 113 and other data, and a RAM 115 for temporarily storing various data, as a work area of the CPU 113.

The recording unit 102 is provided with a thermal line head, for image recording on the recording sheet by means of the thermal transfer recording method, the structure of which will be explained in detail later with reference to FIG. 1. An operation unit 103 is provided with function keys such as for starting the transmission, and input keys for entering a telephone number. A switch 103*a* to be operated by the operator indicates the kind of the ink sheet to be employed; a multi-printing ink sheet when it is on, or an ordinary ink sheet when it is off. There are further provided an indicating unit 104, provided in the operation unit 103 for indicating the status of the apparatus and various functions; a power supply unit 105 for supplying the electric power to the entire apparatus; a modem (modulation/demodulation unit) 106; a network control unit 107; and a telephone unit 108.

Now reference is made to FIG. 1 for explaining the structure of the entire apparatus, wherein the same components as those in FIG. 2 are represented by the same numbers.

Referring to FIG. 1, the recording sheet 11 is stored as a roll 10 wound around a core 10*a*. Said rolled paper 10 is rotatably housed in the apparatus, so as to feed the recording sheet 11 to a thermal head 13 by the rotation, in a direction indicated by an arrow, of the platen roller 12 driven by a recording sheet conveying motor 24. A rolled sheet loading unit 10*b* detachably contains the rolled sheet 10. The platen roller 12 serves to transport the recording sheet 11 in a direction b, and to press an ink sheet 14 and the recording sheet 11 against a heat-generating member 132 of the thermal head 13. After the image recording with the thermal head 13, the recording sheet 11 is conveyed toward discharge rollers 16*a*, 16*b* by further rotation of the platen roller 12, and is then cut into a page by the engagement of cutter blades 15*a*, 15*b* after the image recording of a page, and is finally discharged.

There are provided an ink sheet feed roller 17 on which the ink sheet 14 is wound, and an ink sheet takeup roller 18 driven by an ink sheet conveying motor to be explained later, for taking up the ink sheet 14 in a direction a. Said feed roller 17 and takeup roller 18 are detachably loaded in an ink sheet loading portion 70 of the apparatus. There are further provided a sensor 19 for detecting the remaining amount and the speed of the ink sheet 14; an ink sheet sensor 20 for detecting the presence of the ink sheet 14; a spring 21 for pressing said thermal head 13 against the platen roller 12 across the recording sheet 11 and the ink sheet 14; a sensor 22 for detecting the presence of the recording sheet; and a roller 72 for guiding the ink sheet 14.

In the following there will be explained the structure of the reading unit 100.

A light source 30 illuminates an original 32, and the reflected light is guided through an optical system (composed of mirrors 50, 51 and a lens 52), to a CCD sensor 31 for conversion into electrical signals. The original 32 is conveyed with a speed corresponding to the reading speed, by means of rollers 53, 54, 55, 56 driven by an unrepresented original conveying motor. Plural originals 32 stacked on an original stacker 57 are guided by a slider 57*a*, separated one by one by the cooperation of a transport roller 54 and a separating piece 58, and then advanced to the reading unit 100, and discharged onto a tray 77 after image reading.

A control board 41, constituting the principal part of the control unit 101, sends various control signals to the various units of the apparatus. There are further provided a modem board 106 for effecting communication process; and an NCU board 107 for connection with the telephone line.

Figure 3:
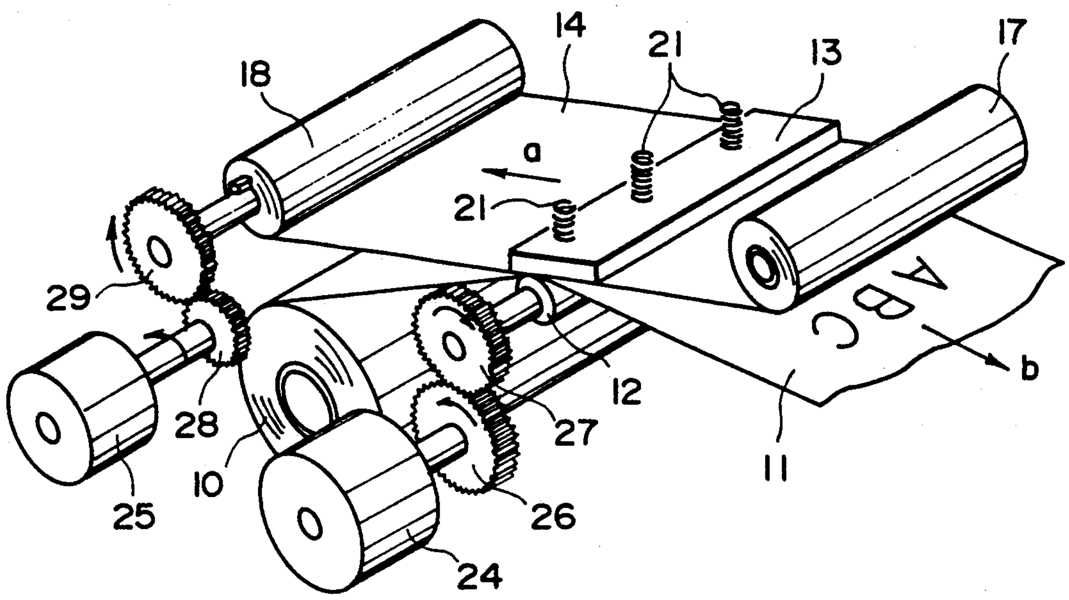
FIG. 3 is a view showing the structure of a conveying system for the ink sheet and the recording sheet.

FIG. 3 shows the details of the conveying mechanism for the ink sheet 14 and the recording sheet 11.

A recording sheet conveying motor 24 rotates the platen roller 12, thereby advancing the recording sheet in a direction b opposite to the direction a. An ink sheet conveying motor 25 advances the ink sheet 14 in the direction a. There are further provided gears 26, 27 for transmitting the rotation of the motor 24 to the platen roller 12; and gears 28, 29 for transmitting the rotation of the ink sheet motor 25 to the takeup roller 18.

As the conveying directions of the recording sheet 11 and the ink sheet 14 are mutually opposed as explained above, the advancing direction of the ink sheet 14 coincides with the direction of image recording in the longitudinal direction of the recording sheet 11 (direction a, which is opposite to the conveying direction of the recording sheet 11). By assuming that the conveying speed $V_p$ of the recording sheet 11 is $V_p = -n \cdot V_I$ wherein $V_I$ is the conveying speed of the ink sheet 14 and the negative sign indicates that the conveying direction of the recording sheet 11 is opposite to that of the ink sheet 14, the relative speed of the recording sheet 11 and the ink sheet 14 with respect to the thermal head 13 is represented by:

$$V_{PI} = V_P - V_I = (1 + 1/n)V_P$$

which is equal to or larger than $V_p$, and is larger than the relative speed $V_{PI}(-V_P(1-1/n))$ when the recording sheet 1 and the ink sheet 14 are conveyed in the same direction in the conventional manner.

There is also known a method, in recording n lines with the thermal head 13, of conveying the ink sheet 14 in a direction a by a distance (l/m) for every (n/m) lines (wherein m is an integer satisfying a condition $n > m$, and l is the length of a line in sub scanning direction), and a method, in recording a length L, of conveying the ink sheet 14 with a speed same as that of the recording sheet 11 but in the opposite direction, and rewinding the ink sheet 14 by $L \cdot (n-1)/n$ $(n > 1)$ prior to the next recording of a predetermined amount. In either case, the relative speed is $V_P$ if the recording is made while the ink sheet 14 is stopped, or $2V_P$ if the recording is made while the ink sheet 14 is moving.

Figure 4:
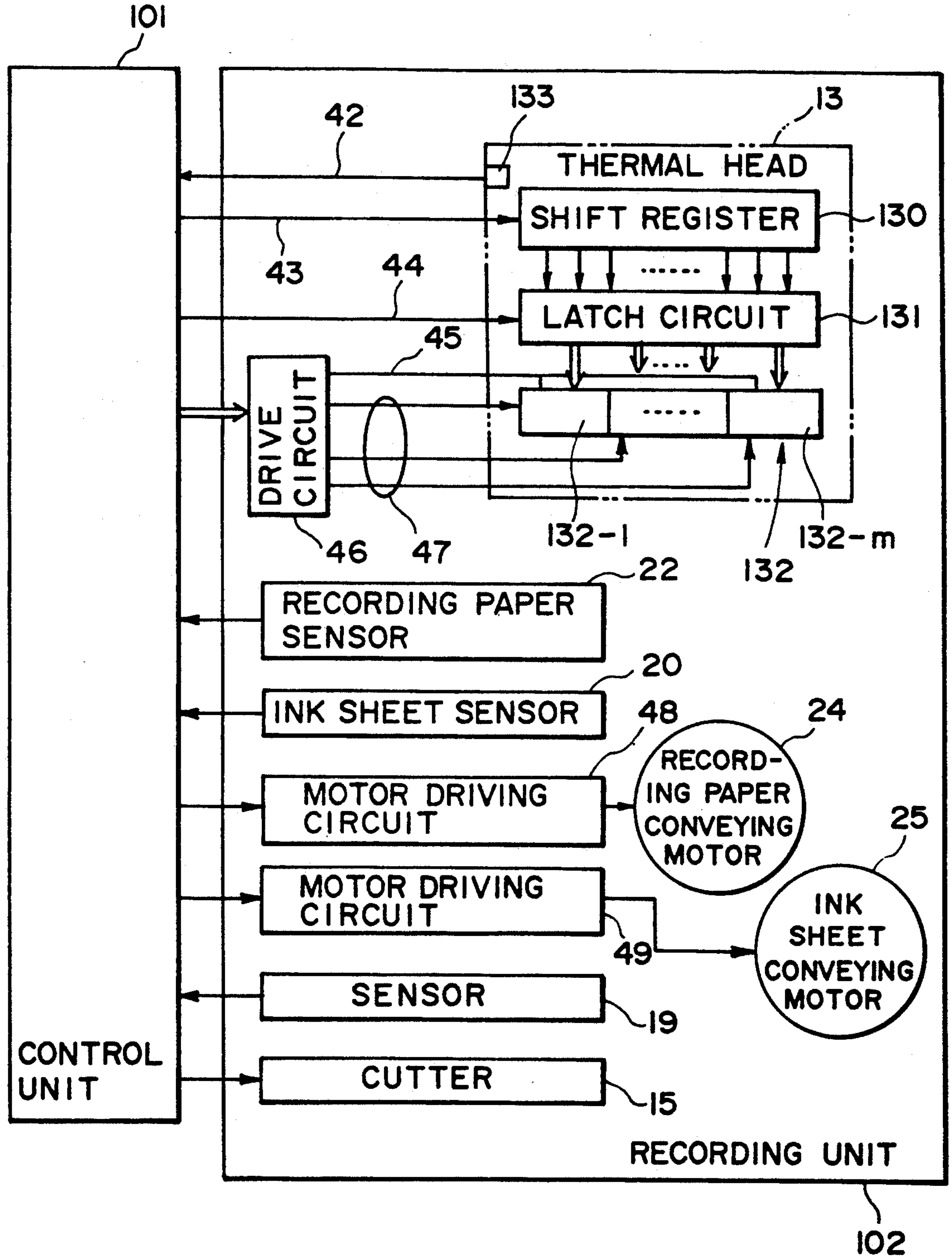
FIG. 4 is a block diagram showing the electrical connections between a control unit and a recording unit of an embodiment.

FIG. 4 shows the electrical connection between the control unit 101 and the recording unit 102 in the facsimile apparatus of the present embodiment, wherein the same components as those in the foregoing drawings are represented by the same numbers.

A thermal head 13, which is a line head, is provided with a shift register 130 for receiving serial recording data 43 of a line from the control unit 101, a latch circuit 131 for latching the data of the shift register 130 in response to a latch signal 44, and heat-generating elements 132 consisting of heat-generating resistors arranged in a line. The heat-generating resistors 132 are driven in m blocks, indicated by 132-1 to 132-m. A temperature sensor 133 is mounted on the thermal head 13 for detecting the temperature thereof, and releases an output signal 42, which is A/D converted in the control unit 101 and is supplied to the CPU 113. Thus the CPU 113 detects the temperature of the thermal head 13 and correspondingly regulates the pulse duration of a strobe signal 47 or the driving voltage of the thermal head 13, thereby varying the energy applied thereto according to the characteristics of the ink sheet 14. The characteristic or species of said ink sheet 14 is designated by the aforementioned switch 103*a*. It may also be identified by a mark printed on the ink sheet 14, or by a mark or a notch provided on a cartridge of the ink sheet 14.

A drive circuit 46 receives the drive signal for the thermal head 13 from the control unit 101, and generates a strobe signal 47 for driving each block of the thermal head 13. Said drive circuit 46 is capable, by the instruction of the control unit 101, of varying the voltage to a power supply line 45 for current supply to the heat-generating resistors 132 of the thermal head 13, thereby varying the energy supplied thereto. Motor drive circuits 48, 49 serve to respectively drive a recording sheet motor 24 and an ink sheet motor 25. Said motors 24, 25 are stepping motors in the present embodiment, but they may also be, for example, DC motors.

The function of the above-explained circuit is as follows. When image signals are entered from the modem 106, the control unit 101 decodes said image signals and stores them in the line memory 110, and gives an instruction for starting the image recording to the recording unit 102. The recording data are serially transferred from the control unit 101 to the shift register 130 of the thermal head 13, and are stored in the latch circuit 131 by the latch signal 44. Then the control unit 101 causes the motor drive circuit 49 to send a phase magnetizing signal to the ink sheet motor 25 and the motor drive circuit 48 to send a phase magnetizing signal to the recording sheet motor 24, thereby advancing the ink sheet 14 in the direction a and the recording sheet 11 in the direction b. Then it causes the drive circuit 46 to release the strobe signal 47, thereby driving the heat-generating elements 132 of the thermal head 13 by the unit of each block and thus recording a line.

The reducing ratio $i_P$ of the gears 26, 27 for the recording sheet motor 24 shown in FIG. 3 and the reducing ratio $i_I$ of the gears 28, 29 for the ink sheet motor 25 are suitably selected in such a manner that the conveying speeds $V_P$ of the recording sheet 11 and $V_I$ of the ink sheet 14, each with respect to the thermal head 13 satisfy the following relation:

$$V_P = nV_I \, (n > 1) \quad (1).$$

Thus, after the recording of a length L, the recording sheet 11 is conveyed by a length L in the direction b, but the ink sheet 14 is only conveyed by a length L/n in the direction a.

In another method for setting the conveying speeds of the ink sheet 14 and the recording sheet 11, the ink sheet motor 24 and the recording sheet motor 25 are stepping motors, and the number $N_I$ of phase magnetizations given to the ink sheet motor 25 per recording of a line and the number $N_P$ of phase magnetizations for the recording sheet motor 24 are mutually related by:

$$N_P = k \cdot N_I \ (k > 0) \quad (2).$$

Thus the magnetizations of $N_P$ times of the recording sheet motor 24 advances the recording sheet 11 by a line, while the magnetizations of $N_I$ times of the ink sheet motor 25 advances the ink sheet 14 by a distance of a/n line.

It is also possible to use stepping motors having different minimum stepping angles for the recording sheet motor 24 and the ink sheet motor 25. In the present embodiment, these means are suitably combined in such a manner that the ink sheet 14 is conveyed by a distance of 1/n line, while the recording sheet 11 is conveyed by a distance of 1 line.

Recording operation (FIGS. 1-6)

Figure 5:
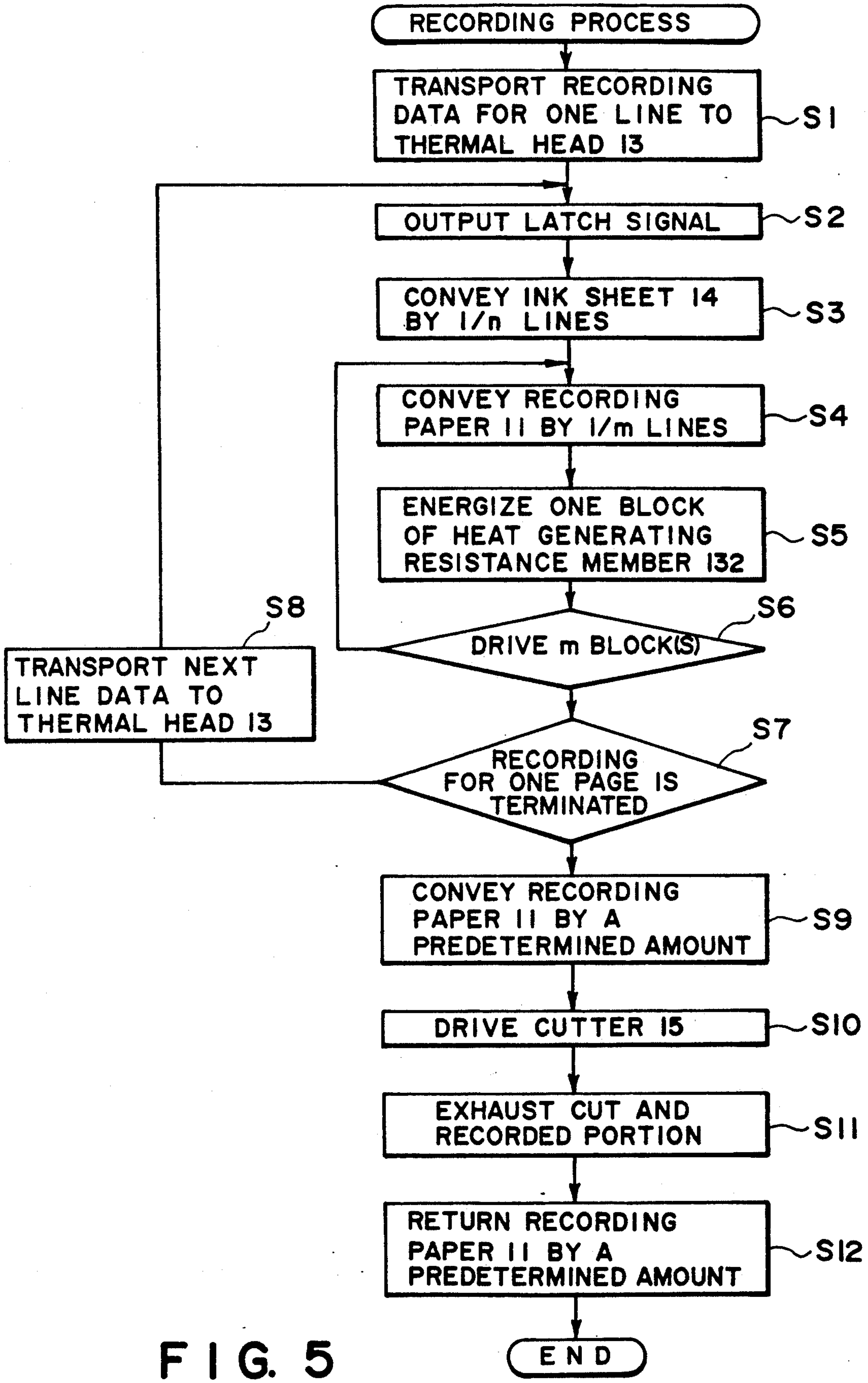
FIG. 5 is a flow chart showing the recording sequence in a first embodiment.

FIG. 5 is a flow chart for the recording sequence of a page in the facsimile apparatus of the first embodiment (k>1), and a corresponding program is stored in the ROM 114 of the control unit 101.

This sequence is started when the image data of a line to be recorded are stored in the line memory 110 and are ready for recording. At first a step S1 sends the recording data of a line serially to the shift register 130. After the transfer of said data, a step S2 releases the latch signal 44 to store the data of a line in the latch circuit 131. Then a step S3 activates the ink sheet motor 25, thereby advancing the ink sheet 14 by a distance of 1/n lines in the direction a shown in FIG. 1.

Then a step S4 activates the recording sheet motor 24, thereby advancing the recording sheet 11 by a distance of 1/m lines in the direction b. A line corresponds to the length of a dot recorded by the thermal head 13, and is equal to 1/15.4 mm in the case of a facsimile apparatus, recordable with a minimum recording time of 2.5 ms. "m" indicates the number of blocks of the heat-generating resistors 132 of the thermal head 13, and is for example equal to 4.

A next step S5 energizes a block of the heat-generating resistors 132 of the thermal head 13. Then a step S6 discriminates whether all m (=4) blocks have been energized, and, if not, the sequence returns to the step S4 for advancing the recording sheet 11 again by ¼ lines and energizing a next block. When the step S6 identifies the completion of image recording of a line, a next step S7 discriminates whether the image recording of a page has been completed. If not completed, a step S8 transfer the recording data of a next line to the shift register 130 of the thermal head 13, and the sequence returns to step S2.

Steps S9 to S12 perform cutter operation, in which the ink sheet 14 may be transported with a speed $V_P/n$ and opposite to the recording sheet 11 as in the image recording, or the value of n may be selected larger than in the image recording. Also the ink sheet 14 may be advanced for example by the platen roller 12 in the same manner as the recording sheet 11, or may be stopped.

When the step S7 identifies the completion of image recording of a page, a step S9 advances the recording sheet 11 by a predetermined amount toward the discharge rollers 16a, 16b until the rear end of image recording of the recording sheet reaches the cutting position of the cutter 15. Then a step S10 activates the cutter members 15a, 15b to cut the recording sheet 11 into a page. Then a step S11 discharges the cut sheet from the apparatus by the discharge rollers 16. Then a step S12 reverses the platen roller 12 to retract the recording sheet 11 by a distance corresponding to that between the thermal head 13 and the cutter 15 in such a manner that the leading end of said sheet is brought to the next image recording position. The image recording of a page is thus completed.

The aforementioned value n, determining the amount of advancement of the ink sheet 14, can be regulated, as explained before, not only by the amounts of rotation of the recording sheet motor 24 and the ink sheet motor 25, but also by the reducing ratios of the gears 26, 27 for the platen roller 12 and of the gears 28, 29 for the takeup roller 18. It can also be regulated, if the recording motor 24 and the ink sheet motor 25 are stepping motors, by selecting motors having different minimum stepping angles. The relative speed of the recording sheet 11 and the ink sheet 14 can thus be set at $(1+1/n)V_P$.

In the present embodiment, the recording sheet motor 24 is composed of a stepping motor of a minimum stepping angle of 1.8°, while the ink sheet motor 25 is composed of a stepping motor of a minimum stepping angle of 7.5°, so that the recording sheet 11 is advanced by a line by 4 magnetizations of the recording sheet motor 24, while the ink sheet 14 is advanced by 1/n lines by a magnetization of the ink sheet motor 25.

As shown in the steps S3 and S4, the ink sheet motor 25 is preferably activated prior to the recording sheet motor 24, because the advancement of the ink sheet 14 is delayed after the energization of the ink sheet motor 25 because of to the characteristics of said motor and the transmission system therefor. A similar effect can be achieved if the recording sheet motor 24 is activated at first, but this may result in a gap between the recorded dots if the time from the start of advancement of the recording sheet 11 to the energization of the thermal head 13 (recording operation in the step S4) becomes longer.

Figure 6:
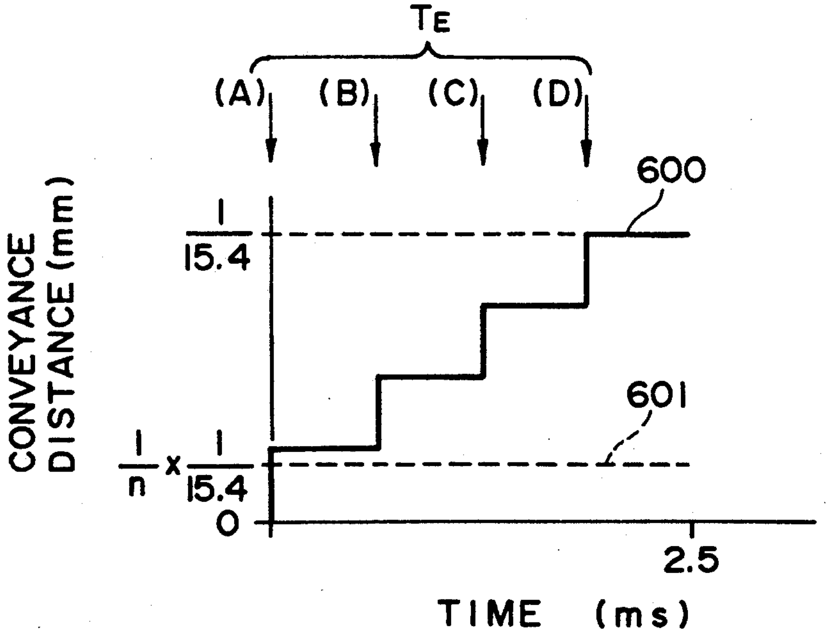
FIG. 6 is a chart showing the relation between the conveyed distance of the recording sheet and the ink sheet, and the drive timing of the thermal head in said first embodiment.

FIG. 6 shows the movements of the recording sheet 11 and the ink sheet 14 in the recording of a line, corresponding to the flow chart shown in FIG. 5. 1 line is equal to 1/15.4 mm, and the recording sheet 11 is advanced by (¼)×(1/15.4) mm at the energization of each block of the thermal head 13. During said transportation of a line, the ink sheet 14 is advanced by 1/n lines.

In FIG. 6, (A)-(D) indicate the timing $T_E$ of energization of 4 blocks of the heat-generating elements of the thermal head 13. A line 600 indicates the amount of movement of the recording sheet 11, and a line 601 indicates that of the ink sheet 14.

As will be understood from FIG. 6, at the energization of the first block, the ink sheet 14 and the recording sheet 11 are both advanced in mutually opposite direction to generate a large relative speed, whereby the ink layer of the ink sheet 14 is properly cut off. In the energizations of the blocks 2-4, indicated by (B)-(D), the ink sheet 14 is stopped but the recording sheet 11 is advanced by ¼ lines at each energization of block so as to always generate a relative speed between the recording sheet 11 and the ink sheet 14, thereby achieving proper peeling of the ink layer.

2nd embodiment (FIGS. 7-10)

Figure 7:
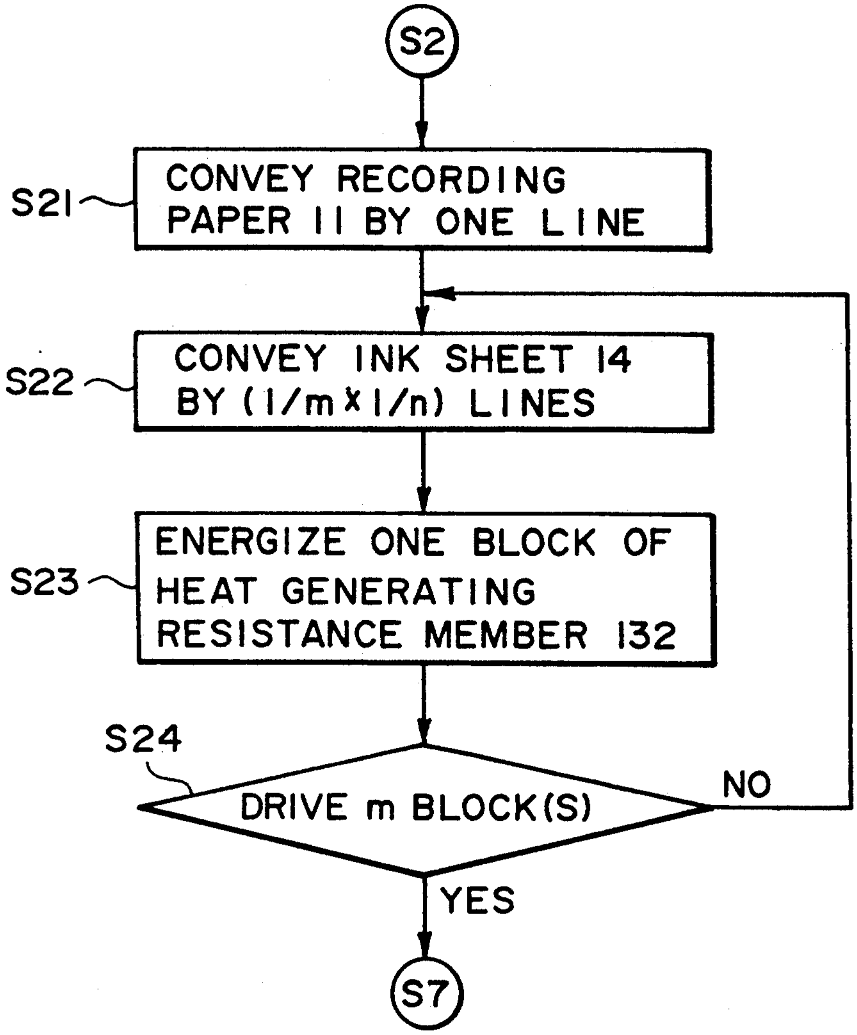
FIG. 7 is a flow chart showing the recording sequence in a second embodiment.

FIG. 7 is a flow chart showing the recording sequence in a 2nd embodiment (1>k>0), indicating the transportation of the recording sheet 11 and the ink sheet 14 and the activation of the thermal head 13 contained in the steps S2 to S7 in FIG. 5.

In FIG. 7, a step S21 advances the recording sheet 11 by a line in the direction b, and a step S22 advances the ink sheet 14 by 1/n×¼ (m=4) lines in the direction a. Then a step S23 energizes a block of the heat-generating resistors 132 of the thermal head 13. A step S24 then discriminates whether all the m (=4) blocks have been energized, and, if not, the sequence returns to the step S22 for advancing the ink sheet 14 by ¼n lines and energizing a next block.

In the present 2nd embodiment, the recording sheet motor 24 is composed of a stepping motor with a minimum stepping angle of 7.5° while the ink sheet motor 25 is composed of a stepping motor with a minimum stepping angle of 1.8°, and the recording sheet 11 is advanced by a line by a magnetization of the recording sheet motor 24 while the ink sheet 14 is advanced by 1/n lines by four magnetizations of the ink sheet motor 25.

Figure 8:
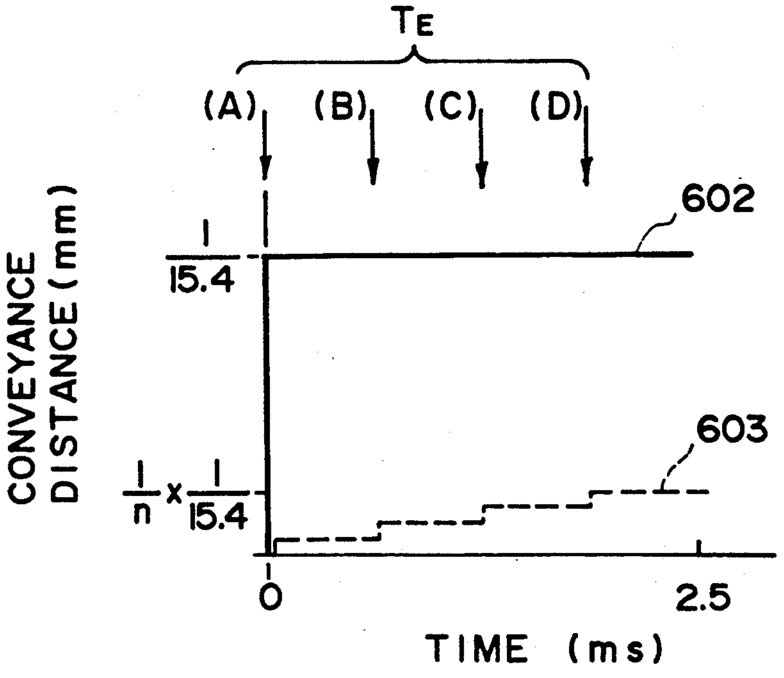
FIG. 8 is a chart showing the relation between the conveyed distance of the recording sheet and the ink sheet, and the drive timing of the thermal head in said second embodiment.

FIG. 8 shows the movements of the recording sheet 11 and the ink sheet 14, and the timing of energization of the thermal head 13. A line 602 indicates the movement of the recording sheet 11, and a line 603 indicates that of the ink sheet 14. The ink sheet 14 is advanced by (¼×1/n×1/15.4) mm at each energization of a block of the thermal head 13.

As in the case shown in FIG. 6, at the energization of the first block, the ink sheet 14 and the recording sheet 11 are both transported in mutually opposite directions to generate a large relative speed, whereby the ink layer of the ink sheet 14 is properly sheared off. At the energizations (B)-(D), the recording sheet 11 is stopped but the ink sheet 14 is advanced by ¼n lines at each recording of the block, there is always generated a relative speed between the recording sheet 11 and the ink sheet 14 as in the case shown in FIG. 6, thereby achieving proper peeling of the ink layer.

In practice, however, said motors 24, 25 generally cannot start rotation at the exact moment of energization, due to the load, inertia, backlash etc. of the driving system. It is therefore preferable, as shown in a flow chart of FIG. 9, to energize the ink sheet motor 25 once (or several times) in a step S31 prior to the above-explained image recording of the 2nd embodiment (steps S33-S35), thereby securely advancing the ink sheet 14 prior to the image recording and thus securely obtaining a relative speed.

Figure 10:
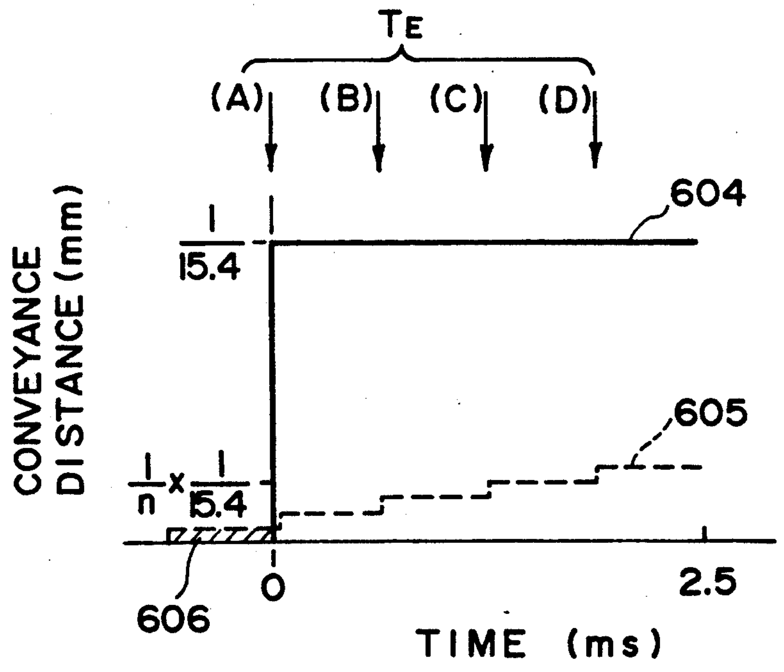
FIG. 10 is a chart showing the relation between the conveyed distance of the recording sheet and the ink sheet, and the drive timing of the thermal head in said variation of the second embodiment.

FIG. 10 shows the movement of the recording sheet 11 (line 604) and that of the ink sheet (line 605), and a line 606 indicates the amount of movement of the ink sheet 14 prior to the movement of the recording sheet 11 in this case.

Such driving method securely generates a relative speed between the ink sheet 14 and the recording sheet 11, and offers the benefit of of utilizing the ink sheet 14 without waste, because the length of transportation per energization of the ink sheet motor 25 is shorter.

Figure 11:
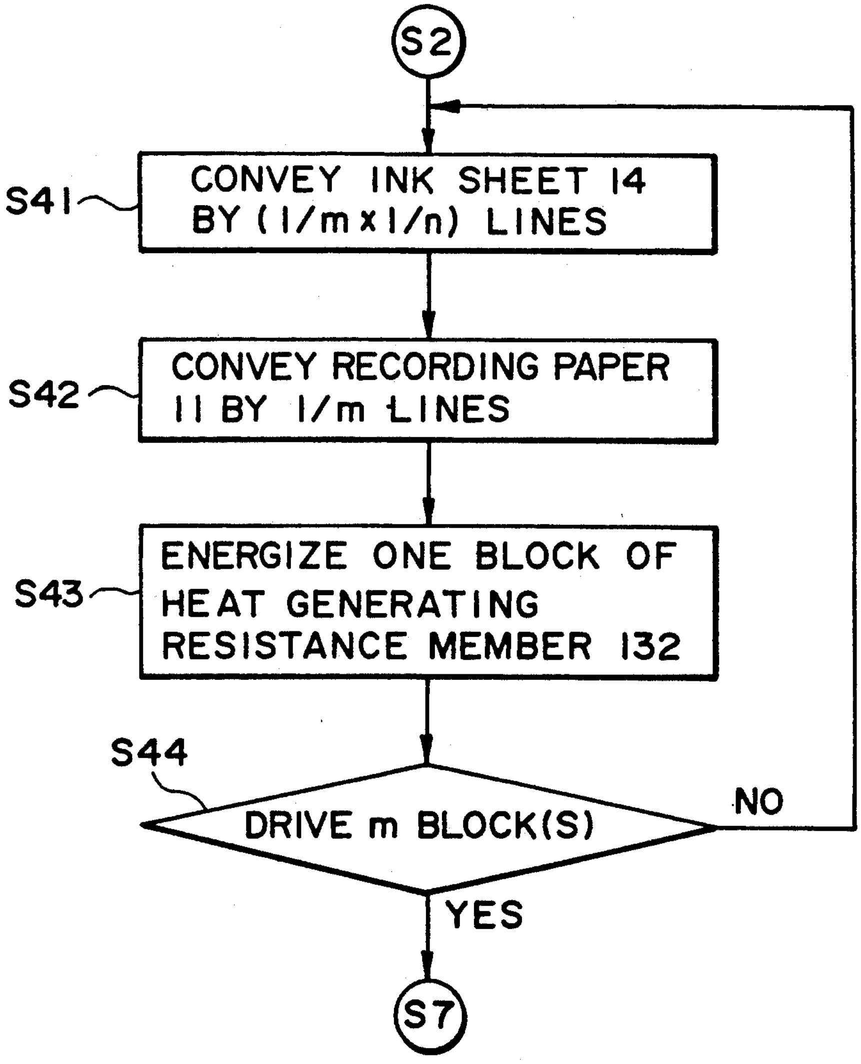
FIG. 11 is a flow chart showing the recording sequence in a third embodiment.
Figure 12:
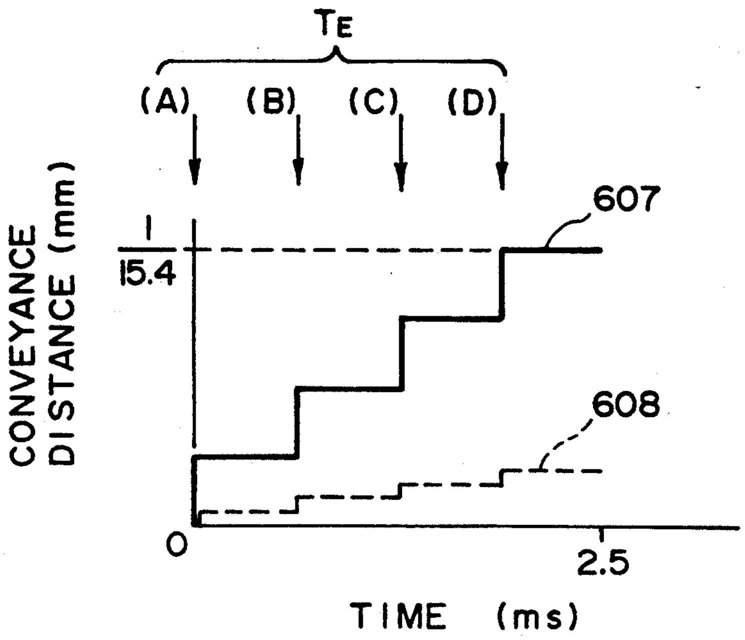
FIG. 12 is a chart showing the relation between the conveyed distance of the recording sheet and the ink sheet, and the drive timing of the thermal head in said third embodiment.

3rd embodiment (FIGS. 11-12)

Figure 9:
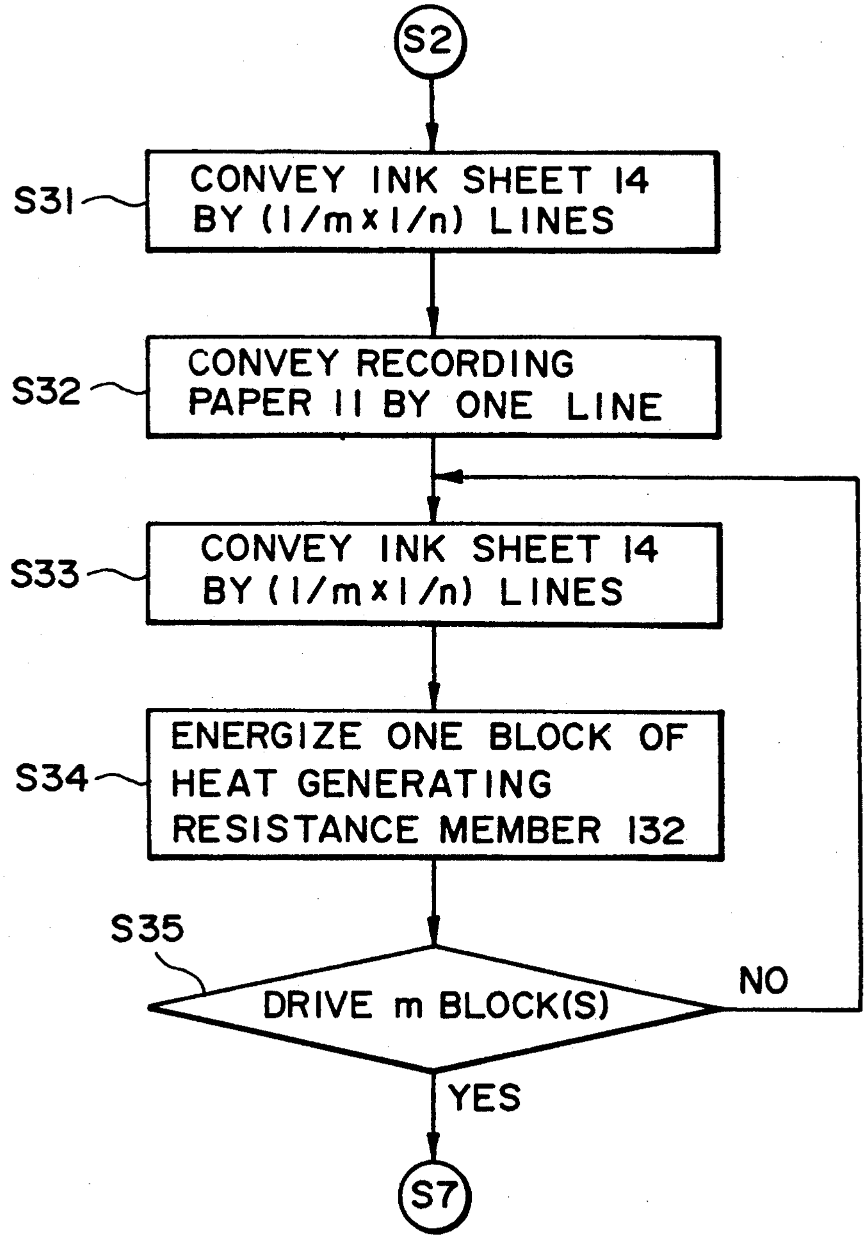
FIG. 9 is a flow chart showing a variation of the second embodiment.

FIG. 11 is a flow chart showing the recording sequence of a 3rd embodiment (k=1), to be inserted in the steps S2 to S7 in FIG. 5, like the flow charts shown in FIGS. 7 and 9.

In this case, a step S41 advances the ink sheet 14 by (¼×1/n×1/15.4) mm, and a step S42 advances the recording sheet by ¼ lines (m=4). Then a step S43 energizes a block of the thermal head, and the steps S41 to S44 are repeated until all the blocks of the thermal head 13 are energized.

In said 3rd embodiment, the recording sheet motor 24 and the ink sheet motor 25 are composed of stepping motor with a minimum stepping angle of 1.8°, and the recording sheet 11 is transported by a line by 4 magnetizations of the motor 24 while the ink sheet 14 is transported by 1/n lines by 4 magnetizations of the motor 25.

FIG. 12 shows the movements of the ink sheet 14 and the recording sheet 11 in this case, respectively, by lines 608 and 607. In this embodiment, the recording sheet 11 and the ink sheet 14 are transported in mutually opposite direction at the energization of each block of the thermal head 13 to increase the relative speed between said sheets, so that the shearing force for the ink layer of the ink sheet 14 can be reduced.

4th embodiment (FIG. 13)

Figure 13A:
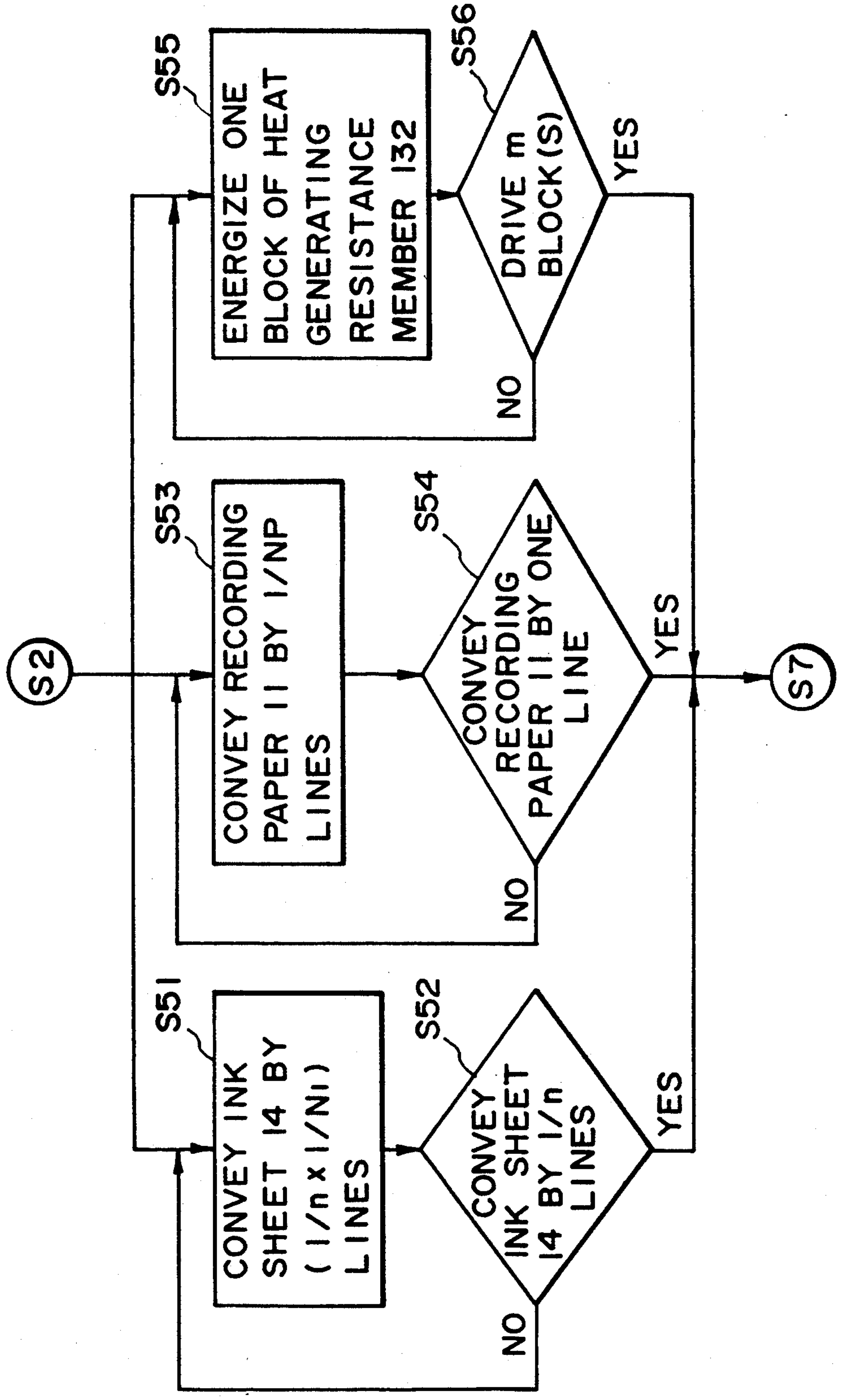
FIG. 13A is a flow chart showing the recording sequence of a fourth embodiment.

FIG. 13A is a flow chart showing the control sequence of a 4th embodiment, which is to be inserted in the image recording of a line, of the steps from S2 to S7 in FIG. 5.

In the foregoing embodiments, the ink sheet 14 or the recording sheet 11 is driven in synchronization of the energization of each block of the thermal head 13. In the present embodiment, however, the movement of the recording sheet 11 and the ink sheet 14 is not synchronized with said energization. More specifically, during the image recording of a line, the ink sheet motor 25 is energized $N_I$ times, while the recording sheet motor 24 is energized $N_P$ times, independently from energization of m blocks of the thermal head 13. At first, for controlling the ink sheet 14 after the step S2, a step S51 advances the ink sheet 14 by (1/n×1/$N_I$) lines. Then a step S52 discriminates whether the ink sheet has been advanced by 1/n lines, and, if not, the step S51 is repeated to advance the ink sheet 14 by (1/n×1/$N_I$) lines. Thus this operation is repeated $N_I$ times for a line.

Also for controlling the recording sheet 11 after the step S2, a step S53 advances the recording sheet 11 by 1/$N_P$ lines. Then a step S54 discriminates whether the recording sheet 11 has been advanced by a line, and, if not, the step S53 is repeated to advance the recording sheet 11 by 1/$N_P$ lines. This operation is thus repeated $N_P$ times for a line.

As regards the thermal head 13 after the step S2, a step S55 energizes a block of the heat-generating resistors 132 of the thermal head 13. The recording of a line is completed by repeating the energization for m blocks.

Thus, in a period from the steps S2 to S7, the ink sheet motor 25 is energized $N_I$ times while the recording sheet motor 24 is energized $N_P$ times, and the drive circuit 46 for the thermal head 13 is activated m times to record the image data of a line. However these steps are not executed simultaneously. After the step S2, the steps S51, S53, S55, S52, S54 and S56 are executed in this order, and the order of execution thereafter is determined by the magnitude of $N_I$, $N_P$ and m.

Figure 13B:
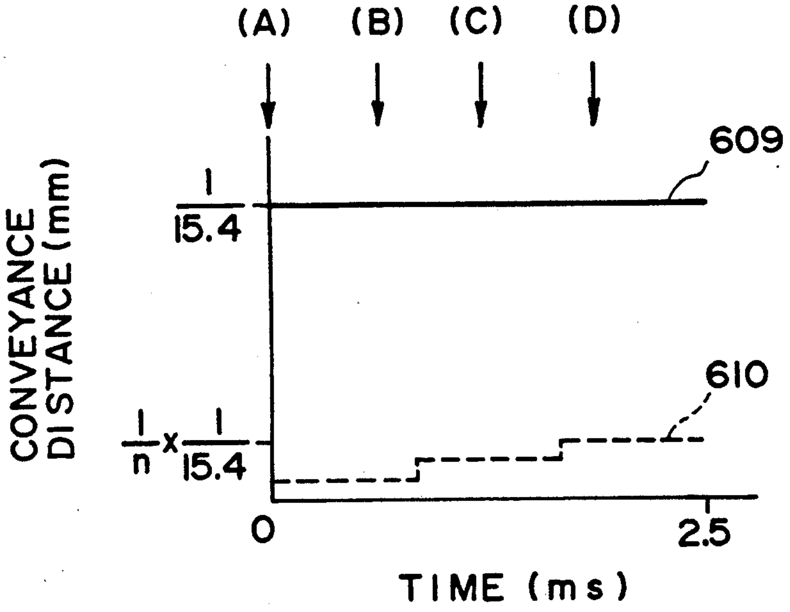
FIGS. 13B to 13E are charts showing examples of conveyance of the recording sheet and the ink sheet in other embodiments.

Now let us consider a case, as shown in FIG. 13B, that the recording sheet 11 is advanced with $N_P=1$ as indicated by a line 609, the ink sheet 14 is advanced with $N_I=3$ as indicated by a line 610, and the thermal head 13 has four blocks (m=4). When the 1st block of the thermal head 13 is energized, the ink sheet 14 and the recording sheet 11 are transported at the same time in the mutually opposite directions, thereby generating a relative speed. In the energization of the 2nd and 3rd blocks, indicated by (B) and (C), the recording sheet 11 is stopped, and the ink sheet 14 is advanced by $(1/n)\times\frac{1}{4}$ lines, not in synchronization with but immediately after the energizations of the thermal head, whereby a relative speed is generated. For the 4th block, neither the recording sheet 11 nor the ink sheet 14 is transported, so that the shearing for this block takes place at the start of image recording for the next line, but the required shearing force is less than $\frac{1}{4}$ of that in the conventional method.

Figure 13C:
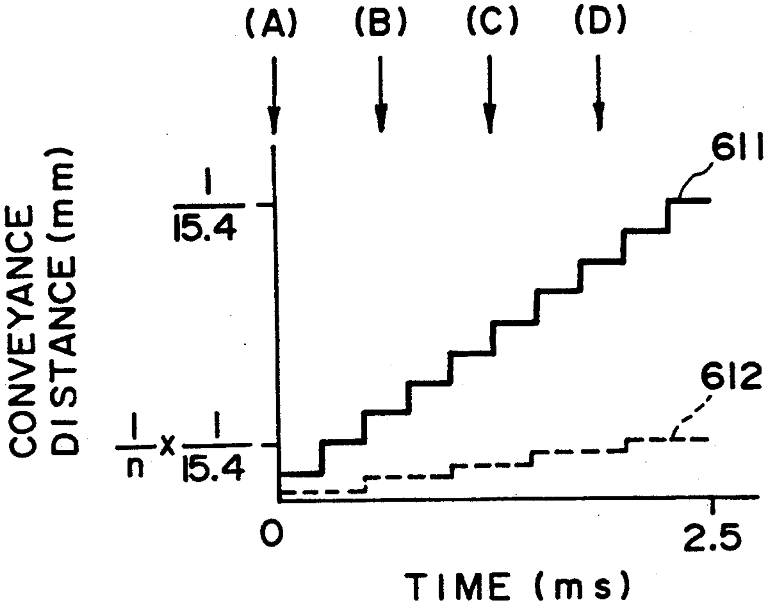

Also by conveying the recording sheet 11 as indicated by a line 611 in FIG. 13C and the ink sheet 14 as indicated by a line 612 with $N_P=10$ and $N_I=5$, a relative speed is obtained between the recording sheet 11 and the ink sheet 14, always during the recording operation.

Figure 13D:
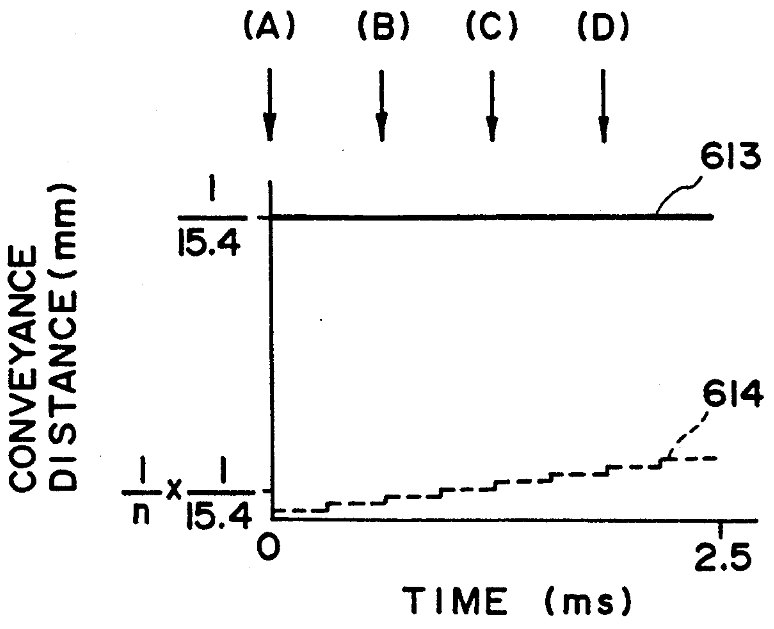
Figure 13E:
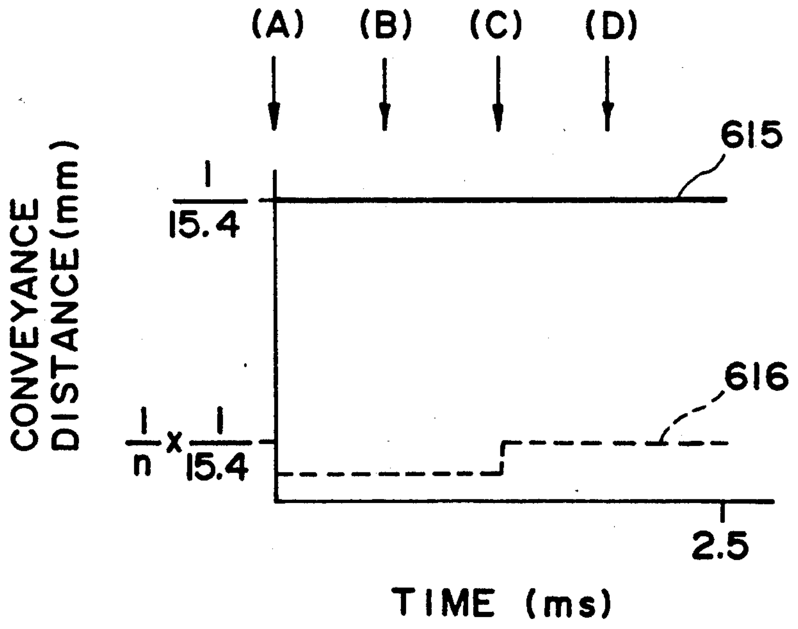

5th embodiment (FIGS. 13D and 13E)

FIG. 13D shows a 5th embodiment, in which lines 613 and 614 respectively indicate the movements of the recording sheet 11 and the ink sheet 14. During the image recording by the energizations of the blocks 1 to 4 (m=4) of the heat-generating elements 132 of the thermal head 13, as indicated by (A) to (D), the recording sheet motor 24 is energized once, while the ink sheet motor 25 is energized eight times ($N_I=2m$). Also in this case there are obtained effects similar to those in the 2nd embodiment, since a relative speed is generated in the energization of each block.

Also even when the ink sheet motor 25 is energized twice ($N_I=m/2$) as indicated by a line 616 in FIG. 13E, the shearing force required for a line is smaller than in the conventional method, since a relative speed is generated at the energization of the blocks 1 and 3 indicated by (A) and (C).

Figure 14:
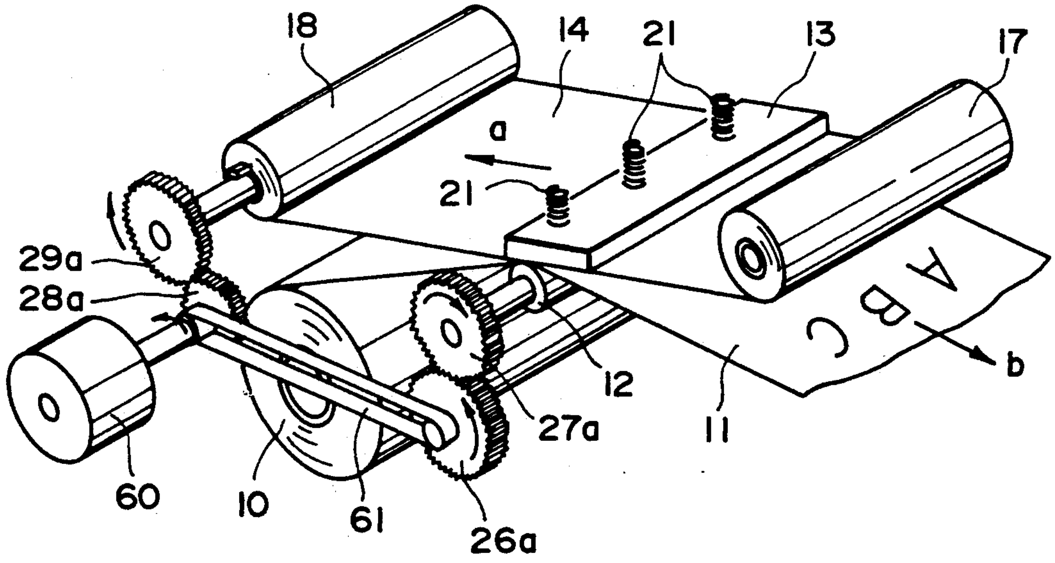
FIGS. 14 and 15 are views of conveying mechanism for the recording sheet and the ink sheet in other embodiments.
Figure 15:
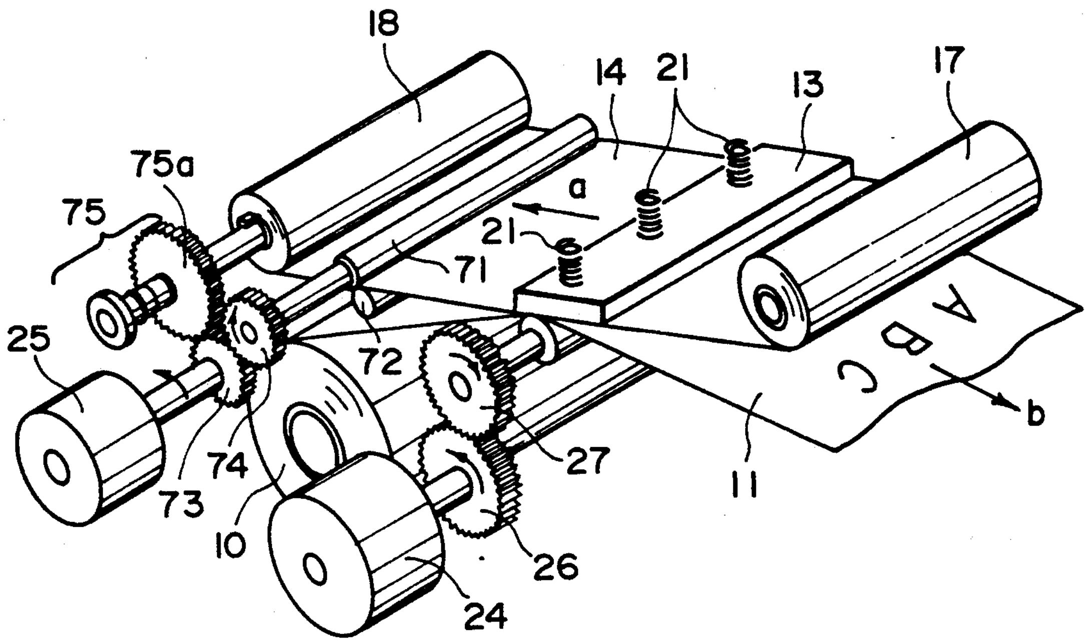

Other embodiments (FIGS. 14 and 15)

FIG. 14 shows an embodiment employing only one motor for the ink sheet 14 and the recording sheet 11. In FIG. 14, the same components as those in FIG. 3 are represented by the same numbers.

A motor 60 drives the takeup roller 18 through gears 28a, 29a, and also drives the platen roller 12 through a belt 61 and gears 26a, 27a. The aforementioned value n can be varied by the reducing ratio of the gears 26a, 27a and that of the gears 28a, 29a. In the present embodiment, the speed (amount of takeup) of the ink sheet 14 varies also by the diameter of the takeup roller 18, and is different between the initial portion of the ink sheet 14 and the last portion thereof. However, such variation in speed does not pose practical problem, as long as the advancing speed of the ink sheet 14 at the final portion thereof is lower than that of the recording sheet 11.

FIG. 15 shows another embodiment in which the takeup roller 18 is not directly driven by the ink sheet motor 25, but the ink sheet 14 is advanced in the direction a by a capstan roller 71 and a pinch roller 72, whereby the ink sheet 14 can always be advanced by a constant amount regardless of the diameter of the takeup roller 18. Again, the same components as those in FIG. 3 are represented by the same numbers.

In the present embodiment, there are provided reducing gears 73, 74, and a slip clutch 75. When the ink sheet motor 25 and the recording sheet motor 24 are activated, the aforementioned value n can be suitably regulated by the reduction ratio $i_I$ of the gears 73, 74 and the reduction ratio $i_P$ of the gears 26, 27. The gear 73 engages with a gear 75a of the slip clutch 75 to enable the takeup roller 18 to wind the ink sheet 14 transported by the capstan roller 71 and the pinch roller 72.

The ink sheet 14 advanced by the capstan roller 71 can be securely taken up by the takeup roller 18, by selecting the ratio of the gears 74, 75a in such a manner that the length of the ink sheet 14 to be taken up by the takeup roller 18 is larger than that transported by the capstan roller 71. The difference between the length taken up by the takeup roller 18 and the length transported by the capstan roller 71 is absorbed by the slip clutch 75. In this manner it is possible to avoid the change in the speed of ink sheet 14, resulting from the change in diameter of the takeup roller 18.

It is also possible to use a single motor for both ink sheet 14 and recording sheet 11, by employing a motor 60 shown in FIG. 14 instead of the motor 25 shown in FIG. 15, and eliminating the motor 24.

Figure 16:
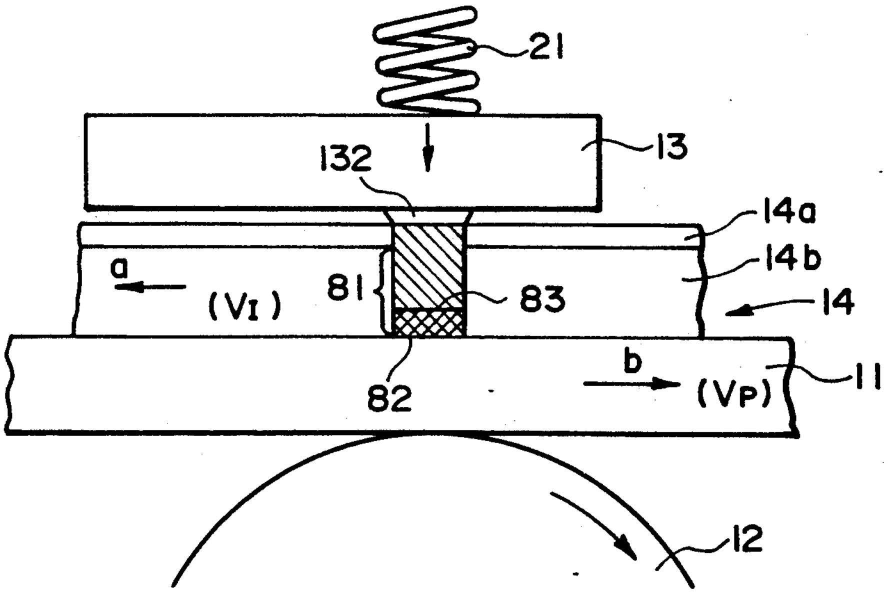
FIG. 16 is a view showing the state of the recording sheet and the ink sheet at recording.
Figure 17:
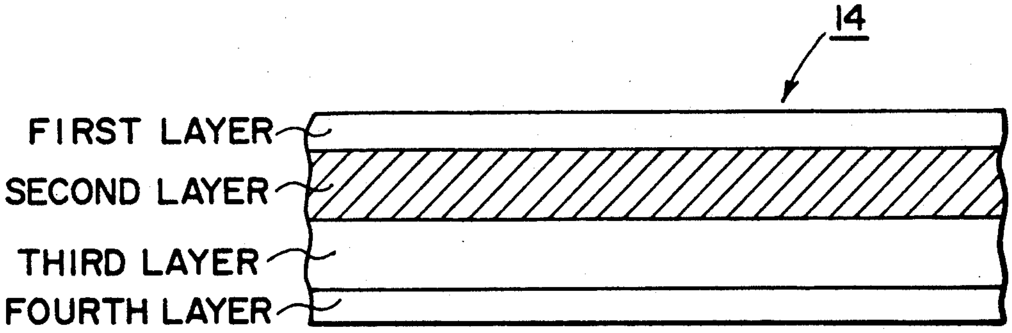
FIG. 17 is a cross-sectional view of a multi-printing ink sheet employed in said embodiments.
Figure 18:
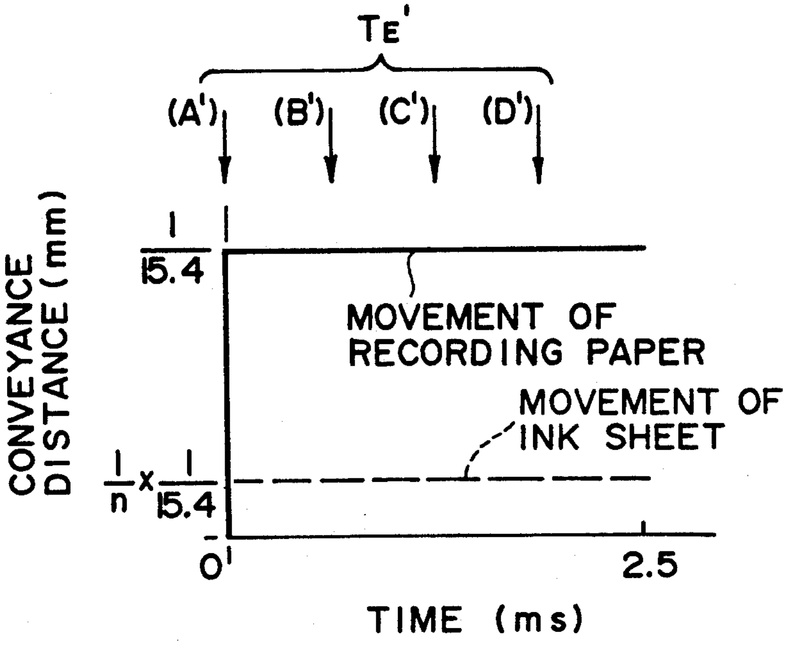
FIG. 18 PRIOR ART
FIG. 18 is a chart showing the relation between the conveyed distance of the recording sheet and the ink sheet, and the drive timing of the thermal head.

Principle of image recording (FIGS. 16 and 17)

FIG. 16 shows the state of image recording in the foregoing embodiments, in which the recording sheet 11 and the ink sheet 14 are transported in mutually opposite directions.

The recording sheet 11 and the ink sheet 14 are sandwiched between the platen roller 12 and the thermal head 13, which is pressed at a predetermined pressure to the platen roller 12 by means of a spring 21. The recording sheet 11 is conveyed in the direction b with a speed $V_P$ by the rotation of the platen roller 12, while the ink sheet 14 is conveyed in the direction a with a speed $V_I$ by the rotation of the ink sheet motor 25. As an alternative, the recording sheet 14 may be in the stopped state.

When the heat-generating resistor 132 of the thermal head 13 is energized by a power source 105, a hatched portion 81 of the ink sheet 14 is heated. The ink sheet 14 has a base film 14a, and an ink layer 14b. The ink of the heated portion 81 of the ink layer is fused, and a portion 82 is transferred onto the recording sheet 11. The transferred portion 82 corresponds approximately to 1/n of the ink layer 81.

At this transfer, it is necessary to generate a shearing force to the ink at the boundary 83 of the ink layer 14b, thereby transferring the portion 82 only to the recording sheet 11. However said shearing force varies with the temperature of the ink layer, and tends to become smaller at a higher temperature of the ink layer. Thus, the shearing force in the ink layer becomes larger when the heating time of the ink sheet 14 is shortened, so that the ink layer to be transferred can be securely peeled off from the ink sheet 14 by increasing the relative speed between the ink sheet 14 and the recording sheet 11.

Since the heating time of the thermal head 13 in the facsimile apparatus is as short as about 0.6 ms, the relative speed between the ink sheet 14 and the recording sheet 11 in the present embodiment is increased by the adjustment in the timing of transportation of the ink sheet 14 and the recording sheet 11.

In the foregoing explanation, it is assumed that the recording sheet 11 and the ink sheet 14 are transported in the mutually opposite directions, but a similar effect can be obtained by transportation in a same direction. For example in FIG. 6, at the energization (A) of the block 1, the relative speed of the ink sheet 14 and the recording sheet 11 becomes smaller as they are transported in the same direction. However, at the energization (B) of the block 2, because of the relative speed resulting from the speed $V_P$ of the recording sheet 11, the shearing required for separating the ink layer is reduced to about half even if combined with the block 1. Also at the energization (C) or (D) for the block 3 or 4, the shearing force is reduced due to the generated relative speed.

FIG. 17 is a cross-sectional view of the ink sheet 14 to be employed in the multi-printing of the present invention, for example having a four-layered structure.

A 2nd layer is composed of a base film, serving as the substrate for the ink sheet 14. Since thermal energy is repeatedly applied to a same position in case of multi-printing, it is preferably composed of an aromatic polyamide film or condenser paper which has a high heat resistance, but a conventional polyester film can also be used for this purpose. Its thickness should be as small as possible for improving the print quality, but is preferably in a range of 3–8 μm because of consideration of mechanical strength.

A 3rd layer is composed of an ink layer capable of n transfers to the recording sheet. It is principally composed of an adhesive such as EVA resin, a coloring material such as carbon black or nigrosin dye, and a binder such as carnauba wax or paraffin wax, so as to be usable n times in a same position. The coating amount of said layer is preferably in a range of 4–8 $g/m^2$, but can be arbitrarily selected according to the desired sensitivity and density.

A 4th layer is a top coating layer for preventing the pressure transfer of the ink to the recording sheet, and is composed for example of transparent wax. Thus the pressure transfer takes place only in said 4th layer, and any background smear on the recording sheet can be prevented. A 1st layer is a heat-resistant coating for protecting the base film of the 2nd layer from the heat of the thermal head. Said head resistant layer is preferable for multiprinting in which heat energy of plural lines may be applied to a same position (if black dots occur repeatedly), but it may be dispensed with if desirable. It is particularly effective for a base film of relatively low heat resistance, such as polyester film.

The ink sheet is not limited to the above-explained example, and there may be employed an ink sheet composed of a base layer and a porous ink support layer provided on one side of the base layer and impregnated with ink, or an ink sheet composed of a base film and a heat-resistant ink layer having a porous network structure and impregnated with ink therein. Also the base film can be composed, for example, of polyimide, polyester, polystyrene, polypropylene, polyvinyl chloride, triacetyl cellulose, nylon or paper.

The heat-resistant coating, which is not indispensable, can be composed, for example of silicone resin, epoxy resin, melamine resin, phenolic resin, polyimide resin or nitrocellulose.

Also the recording medium is not limited to paper but can be any material accepting the ink transfer, such as cloth or plastic sheet. Also the loading of the ink sheet is not limited to the structure shown in the foregoing embodiments, but can by achieved by a so-called ink sheet cassette, which contains ink sheets in a casing.

Furthermore, the ink coated on the ink sheet can be thermo-sublimable, instead of thermofusible. Such thermo-sublimable ink sheet can be composed, for example, of a substrate consisting of polyethylene terephthalate, polyethylene naphthalate or aromatic polyamide, and a layer of coloring material, containing spacer particles, composed of guanamine resin and fluorinated resin, and a dye.

Also, the method of heating is not limited to thermal head heating as explained above, but can be the transfer by current supply or the transfer with laser beam irradiation.

As previously explained in detail the foregoing, the recording sheet 11 and/or the ink sheet 14 is maintained in motion at the recording of a line to generate a relative speed between said recording sheet 11 and said ink sheet 14, whereby the shearing of an ink layer in the ink sheet 14 is facilitated. Thus the amount of ink transfer is made substantially constant in each printing, and deterioration of recorded image quality in the multi-printing can be prevented.

Also the energization of the thermal head 13 is conducted in multiple blocks, and the duration or interval of the strobe signals for said energization is used for determining the timing of transportation of the recording sheet or the ink sheet, whereby the shearing force of ink in the ink layer is reduced and the quality of the recorded image in multi-printing can be improved.

As explained in the foregoing, the present invention maintains a substantially constant amount of ink transfer in each recording, thereby obtaining recorded image of high quality.

What is claimed is:

1. A thermal transfer recording apparatus for transferring ink of an ink sheet to a recording medium thereby recording an image thereon, comprising:
   - recording means for effecting energization in plural blocks for acting on said ink sheet thereby recording the image on said recording medium; and
   - transport means for transporting said recording medium and said ink sheet in different directions at a recording area and in such a manner as to generate a relative speed therebetween, said ink sheet only being conveyed before recording,
   - wherein said recording means energizes a thermal head in a divided manner in m blocks, and said transport means is adapted to transport said recording medium and/or said ink sheet respectively by $-1/m$ and $1/(m \times n)$ $(m, n > 1)$ of a predetermined length in response to a timing of said energization, so that said recording medium is conveyed by a first amount and said ink sheet being conveyed by a second amount which is a fraction of said first amount.

2. A thermal transfer recording apparatus according to claim 1 wherein said ink sheet is only conveyed before recording is performed and wherein said ink sheet is only conveyed by said second amount before recording.

3. A thermal transfer recording apparatus according to claim 2, wherein said second amount by which said ink sheet is conveyed before recording is $1/n$ $(n>0)$ of said first amount by which said recording medium is conveyed during recording.

4. A thermal transfer recording apparatus for transferring ink of an ink sheet to a recording medium thereby recording an image thereon, comprising:
   - recording means for effecting energization in plural blocks for acting on said ink sheet thereby recording the image on said recording medium, wherein said recording means is adapted to energize a thermal head in a divided manner in m blocks; and transport means for transporting said recording medium and said ink sheet in different directions at a recording area and in such a manner as to generate a relative speed therebetween, said ink sheet only being conveyed before recording, and said transport means being adapted, in recording a length of the image, to transport said recording medium and/or said ink sheet respectively by $-1/m'$ and $1/(m' \times n)$ wherein m' is a dividend or a multiple of m/(m,n>1 and m' not equal to m or 1), so that said recording medium is conveyed by a first amount and said ink sheet is conveyed by a second amount which is a fraction of said first amount.

5. A thermal transfer recording apparatus according to claim 4 wherein said recording medium is conveyed by a first amount and said ink sheet being conveyed by a second amount which is a fraction of said first amount before recording.

6. A thermal transfer recording apparatus according to claim 5, wherein said second amount by which said ink sheet is conveyed before recording is $1/n$ ($n>0$) of said first amount by which said recording medium is conveyed during recording.

7. A thermal transfer recording apparatus according to claims 1 or 4, wherein said recording apparatus is employed in a facsimile apparatus used for recording images in response to signals received through a communication line.

* * * * *

UNITED STATES PATENT AND TRADEMARK OFFICE
CERTIFICATE OF CORRECTION

PATENT NO. : 5,204,692

DATED : April 20, 1993

INVENTOR(S) : TAKASHI AWAI, ET AL.

It is certified that error appears in the above-identified patent and that said Letters Patent is hereby corrected as shown below:

Title page, item

[56] REFERENCES CITED

Under U.S. PATENT DOCUMENTS:
"4,456,392 6/1984 Nozaki ..... 400/120" should be deleted.

Under Attorney, Agent, or Firm:
"Fitzpatrick Cella, Harper & Scinto" should read --Fitzpatrick, Cella, Harper & Scinto--.

IN [57] ABSTRACT

Line 5, "so transported" should read --transported so--.

COLUMN 1

Line 46, "sheet allows" should read --sheets allow--.
Line 47, "recording" should read --recording,--.

COLUMN 2

Line 37, "sheet" should read --sheet.--.

COLUMN 7

Line 56, "transfer" should read --transfers--.

COLUMN 8

Line 37, "to" should be deleted.
Line 61, "tion" should read --tions--.

UNITED STATES PATENT AND TRADEMARK OFFICE

CERTIFICATE OF CORRECTION

PATENT NO. : 5,204,692

DATED : April 20, 1993

INVENTOR(S) : TAKASHI AWAI, ET AL.

It is certified that error appears in the above-identified patent and that said Letters Patent is hereby corrected as shown below:

COLUMN 10

Line 19, "direction" should read --directions--.

COLUMN 13

Line 21, "consideration" should read --considerations--.

COLUMN 14

Line 9, "the" (first occurrence) should read --in the--.
Line 18, "Also" should read --Also,--.
Line 27, "obtaining" should read --obtaining a--.

COLUMN 15

Line 10, "m/(m,n>1" should read --m(m,n>1--.

UNITED STATES PATENT AND TRADEMARK OFFICE
CERTIFICATE OF CORRECTION

PATENT NO. : 5,204,692

DATED : April 20, 1993

INVENTOR(S) : TAKASHI AWAI, ET AL.

It is certified that error appears in the above-identified patent and that said Letters Patent is hereby corrected as shown below:

COLUMNS 15-16

Claim 5 should read:

--5. A thermal transfer recording apparatus according to claim 4, wherein said ink sheet is only conveyed before recording is performed and wherein the ink sheet is only conveyed by said second amount before recording.--.

Signed and Sealed this

First Day of March, 1994

Attest:

Bruce Lehman

BRUCE LEHMAN

*Attesting Officer*

*Commissioner of Patents and Trademarks*

--